United States Patent [19]

Lanier, Jr.

[11] 4,338,870

[45] Jul. 13, 1982

[54] HIGH TEMPERATURE OXYGEN HAZARDOUS WASTE INCINERATOR

[75] Inventor: John H. Lanier, Jr., Murfreesboro, Tenn.

[73] Assignees: Holley Electric Corp., Jacksonville, Fla.; J. B. Dicks & Ass. Inc., Tullahoma, Tenn.

[21] Appl. No.: 213,636

[22] Filed: Dec. 5, 1980

[51] Int. Cl.[3] .......... F23G 7/00

[52] U.S. Cl. .......... 110/346; 110/237; 110/254

[58] Field of Search .......... 110/237, 238, 243, 244, 110/254, 346, 302; 431/5, 11

[56] References Cited

U.S. PATENT DOCUMENTS

| | | | |
|---|---|---|---|
| 3,195,608 | 7/1965 | Voorheis et al. | 431/5 X |
| 3,941,066 | 3/1976 | Itoh et al. | 110/346 |
| 4,094,625 | 6/1978 | Wang et al. | 110/238 X |
| 4,133,273 | 1/1979 | Glennon | 110/237 X |
| 4,230,053 | 10/1980 | Deardorff | 110/237 X |

*Primary Examiner*—Edward G. Favors
*Attorney, Agent, or Firm*—Birch, Stewart, Kolasch & Birch

[57] ABSTRACT

The present invention is directed to a method and apparatus for incinerating hazardous wastes through the use of a high temperature incineration process. According to the method of the present invention, substantially pure oxygen is preheated by partial combustion with a fuel such as kerosene. The partial combustion of the oxygen preheats the oxygen to a temperature which is sufficient to produce a hypergolic reaction when the oxygen is mixed with additional fuel. Turbulent flow is produced in the oxygen and simultaneously, a mixture of fuel and hazardous waste is atomized into the turbulent preheated oxygen, thereby quickly mixing the fuel, hazardous wastes, and oxygen. A hypergolic reaction is produced, producing high temperatures which break down the hazardous wastes. The apparatus of the present invention includes a oxygen pre-heater which partially combusts the oxygen and a cylindrical incinerator shell. A oxidant injector plate is disposed between the oxygen preheater and the incinerator shell. Passages formed in the oxidant injector plate inject the preheated oxygen into the incinerator shell creating a turbulent flow into which the fuel and hazardous wastes mixture is atomized. The hypergolic reaction takes place within the incinerator shell and the combustion products are exhausted. A flow controller valve may be provided downstream of the incinerator shell in order to partially block the flow gases therefrom to increase the back pressure within the incinerator shell and thereby increase the residence time of the hazardous wastes.

20 Claims, 5 Drawing Figures

HIGH TEMPERATURE OXYGEN HAZARDOUS WASTE INCINERATOR

FIELD OF INVENTION

This invention relates to a method and apparatus for incinerating organic hazardous wastes, for example polychlorinated biphenyl (PCB) through the use of a high efficiency incineration system.

BACKGROUND OF THE INVENTION

Various thermal destruction processes for disposing of hazardous wastes are known in the art. There are two general types of thermal destruction processes, incineration systems and high efficiency boilers. An attempt has been made to use each of these systems for the destruction of various hazardous wastes, including PCBs.

One type of incinerating system known in the prior art is the rotary kiln incinerator. The rotary kiln incinerator is a cylindrical-refractory lined shell that is mounted horizontally at a slight incline. Waste is fed into the upper end and fuel is fed at the lower end of the kiln. Air is provided for combustion with the fuel to produce heated combustion air. The rotation of the shell causes mixing of the waste with the combustion air and provides sufficient turbulence and agitation to oxidize the waste. It is sometimes necessary to install a secondary high temperature combustion chamber to complete the destruction of vapor phase and particulate materials. The rotary kiln exhibits several problems including the possibility of poor sealing of the rotary kiln ends causing possible leakage of the hazardous waste material. Also, the rotary kiln type of incinerator is relatively expensive, has a low thermal efficiency, and particulate emission is difficult to control.

A second type of incinerator known in the prior art is a liquid injection type incinerator which may be used to dispose of virtually any liquid which is combustible and has a viscosity which allows pumping. The liquid injection type of incinerator also exhibits several problems. The hazardous waste must be presented to the system in the form of a liquid having a viscosity low enough to be pumped and to be atomized in a burner. The burners are subject to plugging, erosion, and corrosion from the fluid presented. Also, the maintenance of combustion efficiency requires sophisticated instrumentation with its attendant expenses.

In the above-mentioned wet oxidation systems, organic wastes are catalytically oxidized with air presented as a aqueous solution in a high pressure environment. In wet oxidation systems, the PCB waste must be in dilute aqueous solution. Also, it has been heretofore impossible to produce the high destruction efficiencies necessary for disposal of extremely hazardous chemicals such as PCBs with this method. Here, the high pressure operation is difficult to control and thus requires special designs and safety measures which may be extremely expensive to implement.

Recently, the Environmental Protection Agency has promulgated a body of regulations termed the Resource Conservation and Recovery Act. This Act places severe restrictions on the producers of hazardous wastes and under a "cradle-to-grave" liability clause and forces producers to be involved in the storage and disposal of their wastes.

The present invention, while useful for incinerating a variety of organic hazardous wastes, is particularly adapted for the incineration of polychlorinated biphenyl (PCB). PCBs have been used extensively in the manufacturing of electrical power transformers. PCB is a stable organic compound of low vapor pressure and dielectric which is extremely resistent to oxidation and is immiscible in water. While these properties make PCB a good electrical transformer fluid, they also make it extremely difficult to break down the chemical. PCB which enters the natural environment will remain in its stable form for years and remain a hazard to human health. Thus, PCB has been determined by the Environmental Protection Agency to be hazardous waste and it is thus subject to close control. Presently, the EPA requires 99,9999 percentage destruction of PCBs.

At the present time, the most attractive process for destroying PCB is the use of high temperature oxidation in which the PCB is converted into its oxide elements. Normally, the aforementioned rotary kiln combustion device is used. The rotary kiln provides an insulated combustion chamber having a relatively low velocity and high residence time of the hazardous material. Thus, a relatively large rotary kiln displays only relatively low mass throughout characteristics. In the rotary kiln, a high residence time is necessary at the normal operating temperature of 1200° C. with 3 percent excess oxygen. It is apparent that incineration of PCBs using a rotary kiln is far from the optimum process.

Heretofore, high mass flux oxygen blown combustors have not been applied to the problem of hazardous waste incineration for commercial applications. The present invention utilizes high mass flux oxygen blown combustion in order to solve many of the problems attendant in the prior art systems.

OBJECTS OF THE INVENTION

It is therefore, an object of the present invention to provide a new and unobvious method and apparatus for incinerating hazardous wastes through the use of high mass flux oxygen combustion.

Another object of the present invention is to utilize high temperature oxygen combustor incineration to provide a relatively high mass flow of hazardous wastes in a relatively small volume.

It is a further object of the present invention to produce this higher mass flow by utilizing oxygen instead of air to avoid the presence of inert, space-occupying nitrogen in the oxidation reaction.

It is still a further object of the present invention to reduce the residence time of the hazardous material in the combustion process by the production of higher temperatures produced by the reduction of nitrogen in the incineration process.

It is still a further object of the present invention to produce a hazardous waste incinerator which allows the reduction in size of the ancillary acid-scrubbing, heat recovery and related equipment normally required in the incineration process.

Another object of the present invention is to reduce the necessary fuel requirements per unit of hazardous waste necessary to insure complete combustion of the waste.

It is a further object of the present invention to provide a hazardous waste incineration system for commercial application which has a relatively high thermal efficiency.

These and other objects of the present invention will become more fully apparent with reference to the following specification and drawings which relate to the preferred embodiments of the present invention.

SUMMARY OF THE INVENTION

The high temperature hazardous waste incinerator of the present invention utilizes extremely high temperatures to achieve high combustion efficiency as well as efficient high volume oxidation of the hazardous waste into its nonhazardous components. The hazardous waste incinerator of the present invention includes four basic components.

First, an oxygen preheater is provided. Oxygen is provided to this preheater as well as a small quantity of a combustion fuel. The fuel is mixed with the oxygen and ignited to heat the oxygen oxidizer to a high temperature. Only a limited amount of fuel is presented to the oxygen preheater so complete combustion of the oxygen cannot occur. The majority of the oxygen presented to the oxygen preheater is thus heated to a temperature sufficient to produce a hypergolic reaction upon mixture of the hazardous waste with the oxidant. Downstream of the oxygen preheater, a cylindrical incinerator is provided to contain the hypergolic combustion process used to oxidize the hazardous waste.

Between the cylindrical incinerator and the oxygen preheater, an incinerator oxident injector plate is provided. A plurality of holes are provided in this plate at predetermined positions and spacings in order to disperse the oxidant in the area downstream from the injector plate. Simultaneously, a hazardous waste injector presents a mixture of hazardous waste and fuel to a nozzle which disperses this mixture downstream of the injector plate. The particular arrangement of the ports provided in the oxident injector plate and the hazardous waste atomizing nozzle creates recirculation patterns which quickly mix the oxygen with the fuel and hazardous waste mixture. The temperature of the oxidant creates a hypergolic reaction which produces high combustion temperatures of approximately 3000° C. The high temperatures rapidly oxidize the hazardous waste into non-hazardous components. The process may be controlled by varying the length of the cylindrical incinerator or injecting predetermined amounts of nitrogen with the oxygen in order to slow the hypergolic reaction.

Also, a flow restrictor valve may be provided at the discharge of the cylindrical incinerator in order to vary the combustion residence time and temperature to allow for the incineration of different types of hazardous wastes.

The incinerated combustion products should be cooled before exhausting them into the atmosphere. In some cases it may be necessary to scrub acid gases from the exhaust flow. Because of the relatively low volume of the oxidants used in the present invention, the size of the necessary scrubbers and heat recovery equipment may be substantially reduced.

Further scope of applicability of the present invention will become apparent from the detailed description given hereinafter. However, it should be understood that the detailed description of specific examples, while indicating a preferred embodiment of the invention, are given by way of illustration only, since various changes and modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and are thus not limitative of the present invention, and wherein.

DETAILED DESCRIPTION OF THE PREFERRED EMBODIMENTS

Figure 1:
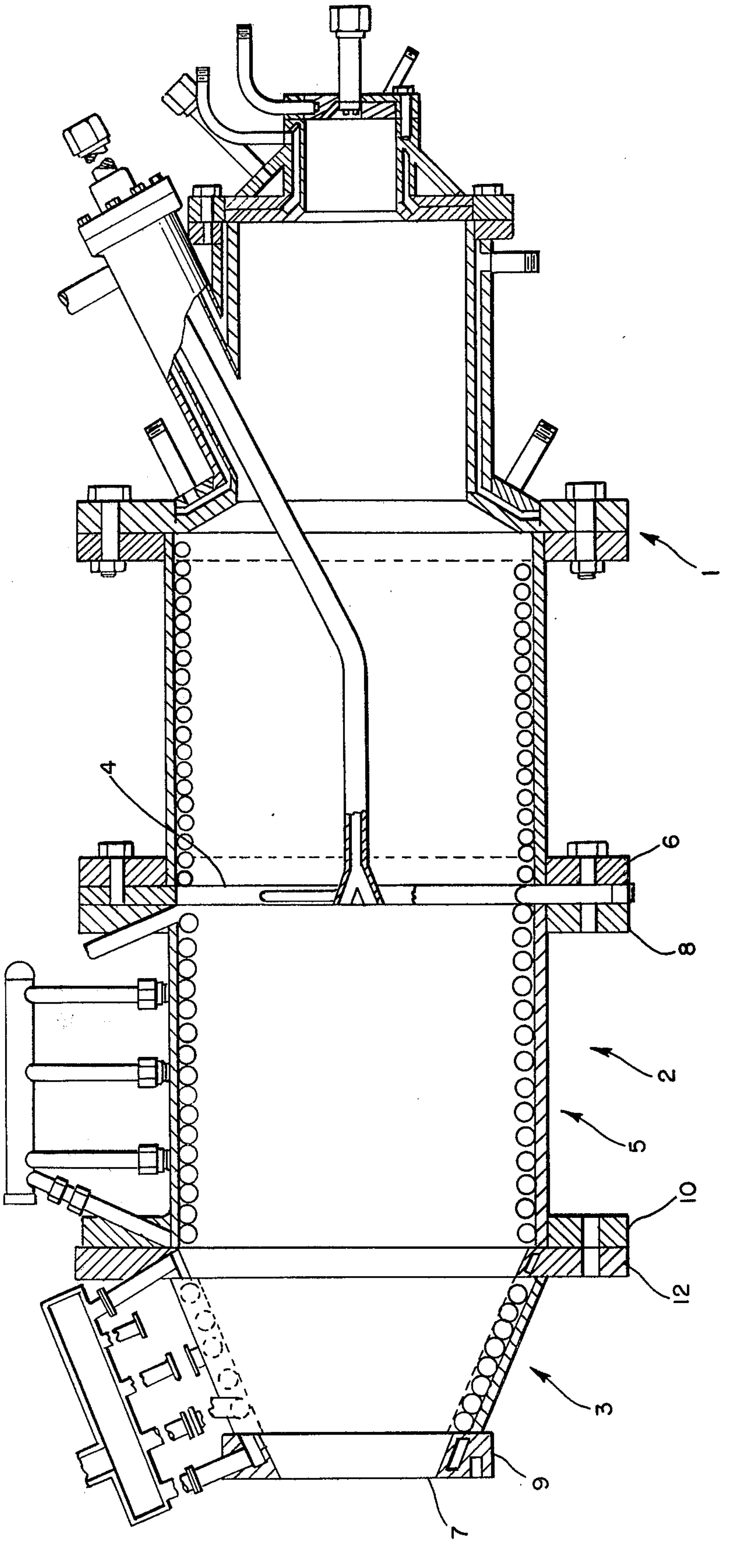
FIG. 1 is a side cross sectional view of a typical incinerator assembly made according to the present invention.

Referring to FIG. 1, the hazardous waste incinerator of the present invention includes four major components, an oxygen preheater, incinerator shell, oxygen injector plate, and a flow restrictor valve assembly. An oxygen preheater (generally indicated as 1) is mounted to a incinerator shell (generally indicated as 2) in any suitable manner. In the preferred embodiment, the incinerator shell 2 includes at least one cylindrical incinerator shell portion 5 and an incinerator shell nozzle 3. The major components are assembled in the following manner. An oxygen preheater annular flange portion 6 is bolted to a first cylindrical incinerator shell annular flange portion 8 to fasten the oxygen preheater 1 to the incinerator shell 2. An oxident injector plate 4 is positioned between the oxygen preheater 1 and incinerator shell 2. Although any suitable provision may be made, in the preferred embodiment the oxident injector plate 4 is sandwiched between the oxygen preheater annular flange portion 6 and the first cylindrical shell annular flange portion 8 when these flange portions are bolted together.

Figure 5:
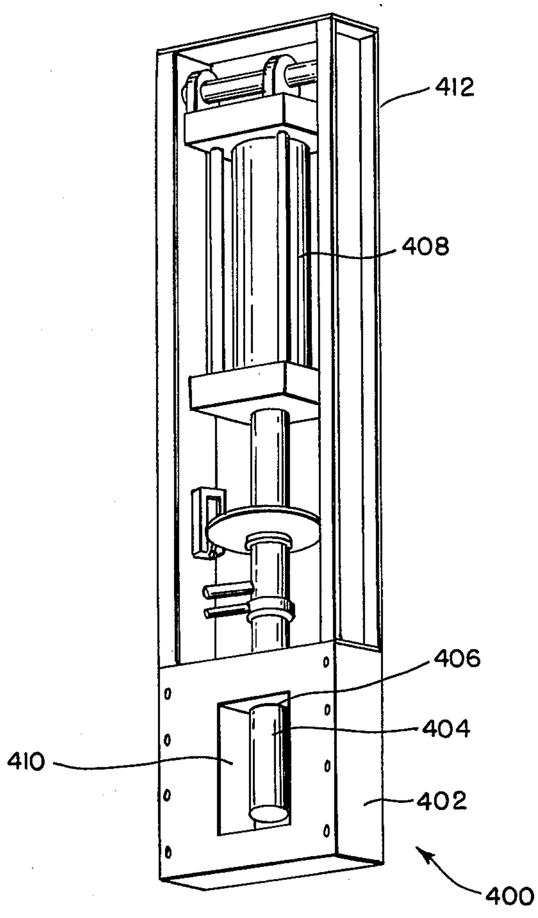
FIG. 5 is a perspective view of a flow restrictor valve which may be optionally used according to the teachings of the present invention.

As will be later discussed, a plurality of cylindrical incinerator shell portions 5 may be bolted together. Each cylindrical incinerator shell portion 5 includes its respective first cylindrical incinerator shell annular flange portion 6 and a second cylindrical incinerator shell annular flange portion 8 to facilitate this attachment. The incinerator output nozzle 3 which is provided with a nozzle mounting flange 12 which is bolted to the second cylindrical incinerator shell annular portion 10 flange of the cylindrical incinerator shell portion 5 on the downstream end of the assembly. In the preferred embodiment, this incinerator output nozzle 3 adapts the cylindrical shape of the incinerator shell 2 to an exit opening 7 of generally rectangular shape. This exit opening 7 is provided with an exit opening flange 9 which may be connected to any necessary ancillary equipment (not shown). While unnecessary for the operation of the present invention, in order to facilitate greater control of the hazardous waste incinerator of the present invention, it may be desirable to utilize a flow restrictor valve assembly 400 as shown in FIG. 5 by attachment of the valve assembly to the exit opening flange 9. Ancillary equipment may then be attached to the valve assembly. Each of the major components of the hazardous waste incinerator will now be described in detail.

Figure 2:
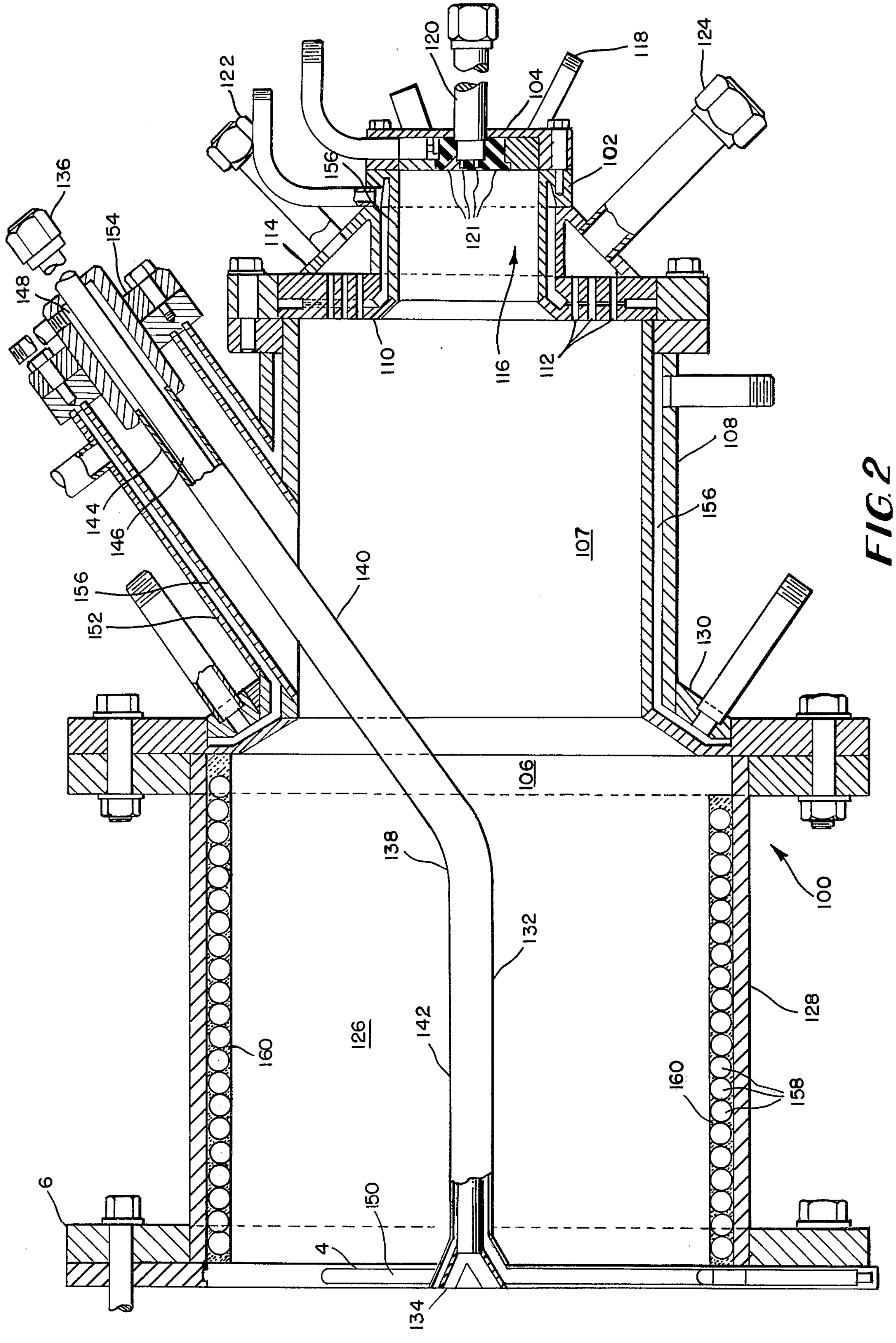
FIG. 2 is a side cross sectional view of the oxygen preheater of the present invention with the waste injector plate installed.

Referring to FIG. 2, the oxygen preheater 1 includes an oxygen preheater housing (generally indicated as 100) which includes three cylindrical housing sections of progressively increasing diameter. A first cylindrical housing section 102 has the smallest diameter of the three housing sections. The upstream end of the first cylindrical housing section 102 is sealed by a housing end plate 104. The downstream end of the first cylindrical housing section opens into a first portion 107 of an oxygen preheater cavity 106 surrounded by a second cylindrical housing section 108 having a diameter greater than that of the first cylindrical housing section 102. The first cylindrical housing section is mounted to the second cylindrical housing section by an annular oxygen injector plate 110. The annular oxygen injector plate 110 has a plurality of oxygen vaporizer throughholes 112 formed therein for distributing oxygen into the oxygen preheater cavity 106. An oxygen injector manifold 114 is provided on the exterior of the annular oxygen injector plate 110 to direct the oxygen to the oxygen vaporizer throughholes 112.

The first cylindrical housing section 102, housing end plate 104, and oxygen injector plate 110 together with the fittings associated therewith, form an oxygen preheat burner assembly (generally indicated as 116). A propane igniter 118 is provided in the housing end plate 104. This propane igniter 118 provides a propane pilot frame to provide ignition within the oxygen preheat burner assembly 116. The propane igniter 118 is a simple flame holder which includes a spark source (not shown) to ignite the air propane stream provided in the interior of the first cylindrical housing section 102. A light oil injector 120 is also mounted in the housing end plate 104. This light oil injector 120 includes a plurality of light oil injector nozzles 122 which atomize the light oil. In the preferred embodiment kerosene is used as the light oil. However, any suitable fuel may be used.

Oxygen is supplied to the oxygen preheat burner assembly 116 through feed lines to a first and a second oxygen feed fittings 122, 124. These fittings present oxygen to the oxygen injector manifold 114 for distribution to the oxygen vaporizer throughholes 112 mounted in the oxygen injector plate 110. Thus, light oil and oxygen are simultaneously provided to the oxygen preheat burner assembly 116 where they intermix and are ignited by propane igniter 118. Because only a limited metered amount of light oil is provided to light oil injector 120, the combustion process consumes only a portion of the oxygen supplied to the system by the oxygen preheat burner assembly 116. This combustion process occurs in the first portion 107 of the oxygen preheater cavity 106 and continues into a second portion 126 of the oxygen preheater cavity 106.

The second portion 126 of the oxygen preheater cavity is located within the third cylindrical housing section 128 which has the greatest diameter of the three cylindrical housing sections 102, 108, 128. The downstream end of the second cylindrical housing section 108 is provided with an annular second preheater housing section adapter portion 130 which compensates for the difference in diameter between the second cylindrical housing section 108 and the third cylindrical housing section 128.

FIG. 2 also illustrates the mounting position of the oxident injector plate 4. The oxygen preheater of FIG. 2 further includes a waste stream feedline 132 for providing a premetered mixture of light oil and hazardous waste to a waste stream injector 134 which dispenses the waste, fuel mixture just downstream of the oxident injector plate 4. The waste, fuel mixture enters the waste stream feedline as waste stream fitting 136. The waste stream then enters a first feedline portion 140 of the waste stream feedline 132 which contains the waste stream and directs in into the oxygen preheater cavity 106. The first feedline portion 140 ends in a waste stream feedline bend 138 as the waste stream feedline 132 nears the center line of the third cylindrical housing section 128. A second feedline portion 142 then extends along the center line of the third cylindrical housing section 128 to present the waste stream to the waste stream injector 134. The waste stream feedline 132 includes an outer waste stream feedline jacket 144 and an inner waste stream conduit 146. A coolant, in the preferred embodiment water, is pumped through a waste stream feedline coolant cavity 148 located between the outer waste stream feedline jacket 144 and inner waste stream conduit 146. The water pumped through the waste stream feedline cavity 148 continues through the oxident injector plate coolant passages 150 formed in the oxident injector plate 4. A waste stream feedline housing 152 intersects the second cylindrical housing section 108 and is sealed by a waste stream feedline housing end plate 154 to seal the oxygen preheater cavity 106 from the outside atmosphere.

The entire oxygen preheater housing 100 is provided with a plurality of housing water passages 156. Water is pumped through the housing water passages 156 to control the temperature of the oxygen preheater housing 100 to avoid overheating. The third cylindrical housing section 128 is subjected to the highest temperatures present in the oxygen preheater 1. Thus, in order to control the temperatures presented to this third cylindrical housing section 128, a plurality of circumferential housing coolant passages 158 are provided to control the generated temperatures. Further, this third cylindrical housing portion 128 is lined with a refractory lining 160 allowing this portion of the oxygen preheater 1 to retain as much heat as possible.

The oxygen preheater 1 presents heated oxidant to the incinerator of the present invention by combusting a portion of the oxygen with a predetermined metered amount of fuel to produce a combustion which heats the oxygen not consumed by the combustion process. This preheated oxygen is then used in the incinerator and combustion is completed downstream of the oxident injector plate 4 in the cylindrical incinerator 2.

Figure 3:
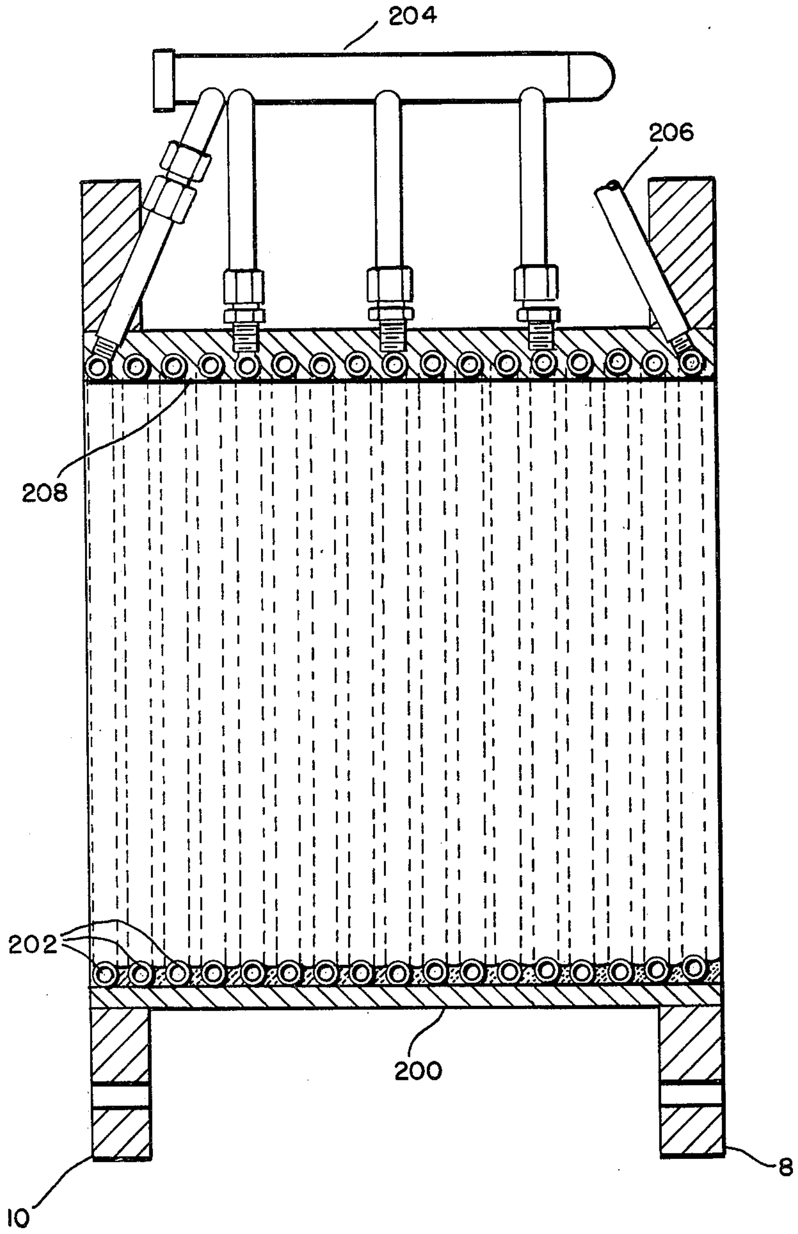
FIG. 3 illustrates a side cross sectional view of a typical refractory lined water-cooled incinerator shell section forming part of the present invention.

Referring to FIG. 3, the cylindrical incinerator portion 5 is, in the preferred embodiment, formed of steel and designed to withstand pressures of up to ten atmospheres. The shell is water cooled with a plurality of circumferential coolant tubes 202 which are connected to a coolant inlet manifold 204 and a coolant outlet manifold 206 which is similar to the coolant inlet manifold but only partially shown. The cylindrical incinerator shell 200 is lined with a refractory lining 208. The circumferential coolant tubes 202 and refractory lining 208 are necessary in order to allow the cylindrical incinerator shell 200 to withstand high thermal loading resulting from the high temperature combustion process. Depending upon the hazardous waste to be incinerated, the required length of the cylindrical incinerator component of the present invention may vary. The variation in length of the cylindrical incinerator component of the present invention varies the combustion residence time so that various types of chemical wastes may be accommodated. In order to more easily vary the length of the cylindrical incinerator, a plurality of the cylindrical incinerator portions 5 such as that shown in FIG. 3 may be bolted together using their respective annular flange portions 8, 10 as previously mentioned. Thus, the overall length and the combustion residence time can be easily varied by simply bolting additional incinerator shell assemblies together to increase the total length of the incinerator shell 2.

The incinerator shell 2 of the present invention includes the incinerator shell nozzle 3. As already discussed, this nozzle includes the annular mounting flange 12 and the rectangular exit opening flange 9. The incinerator output nozzle 3 of the present invention smoothly transforms the circular cross-section of the individual cylindrical incinerator shell portions 5 into a rectangular cross-section to facilitate the attachment of ancillary devices. This incinerator output nozzle 3 is cooled and refractory lined in a manner identical to that of the cylindrical incinerator shell portions 5 and thus the details of these features of the incinerator ouput nozzle 3 need not be explained. Water is pumped through all of the coolant passages of the present invention at a rate sufficient to prevent departure from nucleate boiling.

Figure 4:
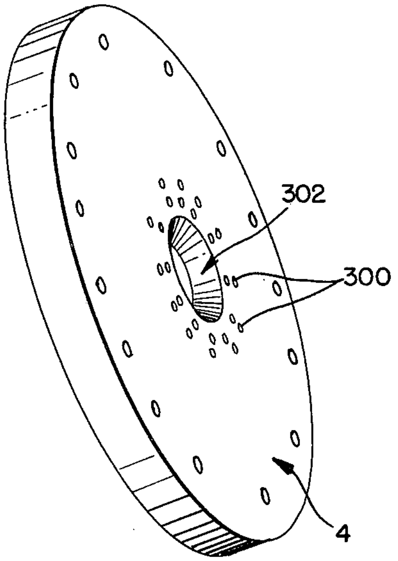
FIG. 4 illustrates a perspective view of a oxident injection plate of the present invention as taken from its downstream side.

An important part of the hazardous waste incinerator of the present invention is the oxident injector plate 4 illustrated in FIG. 4. The oxident injector plate 14 is, in the preferred embodiment, a water cooled copper plate. Water is pumped through the oxident injector plate coolant passages 150 in order to control the temperature of the plate. The oxident injector plate 4 includes a plurality of through hole oxident passages 300 which form atomizing nozzles which pass preheated oxident downstream into the incinerator shell 2. The oxident passes through the through hole oxident passages 300 at a relevant high velocity in such a way to produce a micro-turbulent flow of the incoming hot oxident gases. These jets of hot oxident gases are presented immediately adjacent the waste stream injector 134 which is positioned in a waste stream injector mounting opening 302 as shown in FIG. 2. The hazardous waste stream is formed from a mixture of a waste material such as PCB and a fuel, in the preferred embodiment a light oil. The waste stream injector 134 is a nozzle with a hollow cone spray pattern which atomizes the waste stream at an included angle of approximately 75° in the preferred embodiment. The oxident is injected through the throughhole oxident passages 300. In the preferred embodiment, approximately 30 throughhole oxident passages 300 are provided. The through hole oxident passages 300 are spaced in such a manner to allow rapid mixing and a large recirculation zone near the face of the injector plate. In the preferred embodiment, the through hole oxident passages 300 are approximately 0.375" in diameter. The through hole oxident passages 300 are sized such that the oxident injection velocity is approximately 10 times the velocity of the atomized hazardous waste mixture. The location of the through hole oxident passages 300 is established based upon "cold flow" modeling. Based on the modeling as well as related combustion tests, the following relationships were established as desirable:

$$(Vo/Vhw) \geqq 10.0$$

$$(Doo/Sin)\phi = 6.7$$

$$(Doi/Sin)\phi = 5.5$$

where

Vo = oxidant injection velocity

Vhw = hazardous waste injection velocity

Doo = diameter of outer ring of throughhole oxident passages

Doi = diameter of inner ring of throughhole oxident passages sin$\phi$ = sine of included angle of hazardous waste injection nozzle Thus, it is apparent that the waste stream is injected downstream of the oxident injector plate 4 into a region that is turbulent due to the oxident passing through the throughhole oxident passages 300. The oxident injector plate design developes a combustion zone and that includes a turbulent portion and a portion that is plugged flow (a region of homogenous mixture of the reactionents). Due to the preheated temperature of the oxident, a resultant hypergolic reaction ensues and thus the present invention provides a more efficient combustion within a relatively small volume.

Referring to FIG. 5, the flow restrictor valve assembly 400 of the present invention is shown. This flow restrictor valve assembly 400 may be located downstream of the incinerator in order to more precisely vary the residence time in the incinerator. While the waste incinerator of the present invention may function without the flow restrictor valve assembly 400, this assembly is desirable to allow for flexibility of operation in the event that the incoming waste stream has properties which require the variation of the combustion residence time. The restrictor valve assembly 400 includes a valve frame 402 adapted to mount to the exit opening flange 9 of the incinerator shell 2. In the preferred embodiment, the valve frame 402 is water cooled to avoid over-heating. The valve assembly 400 further includes a flow restrictor 404 which is designed partially to block the opening in the valve frame 402 to increase the backpressure of the incinerator of the present invention and thus increase the residence time. The flow restrictor 404 may be made in any suitable shape. In the present invention, the flow restrictor 404 is a cylindrical water cooled copper cylinder. The cylindrical flow restrictor 404 is mounted in the valve frame 402. A flow restrictor seal 406 is provided to prevent leakage of the combustion gases between the flow restrictor 404 and the valve frame 402. The flow restrictor 404 is controlled by hydraulic drive ram 408. By the suitable application of hydraulic pressure to the hydraulic drive ram 408, the amount of the flow restrictor 404 extending into a valve port 410 defined by valve frame 402 may be controlled. A frame 412 supports the hydraulic drive ram 408.

If proper incineration of a particular hazardous waste requires a reduction in the combustion temperature, the combustion temperature may be reduced by injecting small amounts of nitrogen into the oxygen preheater 1 in order to reduce combustion temperatures.

OPERATION OF THE PREFERRED EMBODIMENT

In operation, the hazardous waste incinerator of the present invention functions as follows:

The hazardous waste incinerator of the present invention is supplied with oxygen through first and second oxygen feed fittings 122, 124 which provide oxygen to the oxygen injector manifold 114. The oxygen supplied may be either in gaseous or cryogenic form. The oxygen supplied to the oxygen injector manifold 114 is vaporized as it passes through oxygen vaporizer throughholes 112. The quantity of oxygen supplied to the system is monitored and controlled. Simultaneously, a light oil such as kerosene is supplied to the light oil injector 120 and is atomized in the light oil injector nozzles 121. The light oil and oxygen intermix and the propane igniter 118 provides a pilot flame to ignite the mixture of light oil and oxygen. Once the light oil-oxygen mixture is ignited, the propane igniter 118 may be turned off as the combustion process will continue on its own. The amount of fuel provided by the light oil injector 118 is precisely metered to provide only a partial combustion of the oxygen presented by the oxygen vaporizer throughholes 112 of the oxygen injector manifold 114. This limited combustion which occurs in oxygen preheater cavity 106 preheats the remaining oxygen and combustion products to a temperature of about 1400° C. By the proper metering of the light oil to provide a proper light oil to oxygen mixture, the mixture of oxygen and combustion products consists of about 70 percent $O_2$, 15 percent $CO_2$, and 15 percent $H_2O$. This mixture flows downstream and passes through the throughhole oxidant passages 300 of the oxident injector plate 4. Simultaneously, a waste stream injector 134 presents a waste mixture downstream of the oxident injection plate 4. The waste stream is a mixture of a light oil and the liquefied hazardous waste. A preferred mixture includes substantially equal parts of fuel and hazardous waste. Virtually any type of hazardous waste may be included in the mixture subject only to the atomizing of the waste stream by the waste stream injector 134. Due to the spacing of the throughhole oxidant passages 300, as well as their diameter and placement, and also due to the relatively high velocity of the oxidant exiting the throughhole oxidant passages 300, a velocity on the order of 1,000 feet/second, a microturbulent flow is formed immediately downstream of the oxident injector plate 4. Simultaneously, the waste stream mixture is atomized by the waste stream injector 134 and exits this injector with a velocity of approximately 100 feet/second. Thus, the waste stream and the oxidant are intermixed. Because of the relatively high temperature, of the oxidant, a hypergolic reaction is generated. This produces a high flame temperature of approximately 3000° C. in the incinerator shell. Heat loss in the incinerator is minimized by the use of the refractory lining 208. With a temperature of approximately 3000° C., the reaction rate is on the order of tens of milliseconds and thus complete incineration of the hazardous waste stream is quickly accomplished.

The flow restrictor valve assembly 400 located downstream of the incinerator is used to increase incineration pressure and thereby increase residence time to provide more time for incineration of the hazardous waste, if necessary.

The discharge of the incinerator may then be passed through a quench or waste heat boiler to lower the temperature of the incinerator exhaust gases and to produce heat for other applications, for example the production of electricity. After quenching, the incinerator exhaust gases may contain acid gases requiring neutralization. This is particularly true of hazardous wastes containing chlorine which break down into hydrogen chloride which produces hydrochloric acid. The methods chosen for the neutralization of exhaust gases are well known in the art and an appropriate method can be chosen from these methods. However, because the process of the present invention utilizes substantially pure oxygen rather than atmospheric air, the volume of gas which must be scrubbed per unit of hazardous materials is substantially reduced. The treated incinerator gases may then be discharged into the atmosphere since all environmental hazards existing in the materials have been corrected.

It should be understood that the process and apparatus for incinerating hazardous waste according to the present invention may be modified as would occur to one of ordinary skill in the art without departing from the spirit and scope of the present invention.

I claim:

1. An apparatus for incinerating hazardous waste comprising:
- an incinerator shell;
- means for providing a mixture of a fuel and the hazardous waste to said incinerator;
- means for preheating oxygen to a temperature sufficient to produce a hypergolic combustion when mixed with the fuel provided by said means for providing; and
- means for mixing said mixture and said preheated oxygen and for producing a hypergolic combustion in said incinerator shell;
- said hypergolic combustion producing temperatures sufficient to oxidize said hazardous waste.

2. The apparatus of claim 1, wherein said means for preheating oxygen comprises:
- a preheater combustion cavity;
- oxygen supply means for providing oxygen to said preheater combustion cavity;
- fuel supply means for supplying metered amounts of fuel to said preheater combustion cavity; and
- igniter means for at least initially igniting the combustion of said fuel and a portion of said oxygen to thereby produce heat;
- said oxygen supply means supplying said oxygen at a rate greater than the rate the combustion within said preheater combustion cavity can consume said oxygen.

3. The apparatus of claim 2, wherein said means for preheating causes said oxygen to flow toward said incinerator shell;
- said means for mixing including:
- a plate extending transversely to the direction of flow of said preheated oxygen, said plate having throughholes formed therein for passage of said oxygen, said plate creating an area of turbulence which facilitates mixing of said mixture of said preheated oxygen; and
- atomizer means for atomizing said mixture provided by said means for providing and for presenting said atomized mixture in the area of turbulence formed by said plate.

4. The apparatus of claim 3, wherein said incinerator shell is lined with a refractory material.

5. The apparatus of claim 3, wherein said hypergolic combustion produces combustion products;
- said apparatus further comprising valve means for restricting flow of combustion products from said incinerator shell to thereby increase the residence time of said mixture and oxygen in said incinerator shell.

6. The apparatus of claim 3, wherein said incinerator shell and said preheater combustion cavity are provided with coolant passages; and wherein a coolant is pumped through said passages.

7. The apparatus of claim 6, wherein said coolant is pumped at a rate sufficient to prevent departure from nucleate boiling.

8. The apparatus of claims 1, 2 or 3, wherein substantially pure oxygen is provided to said means for preheating.

9. The apparatus of claims 1, 2, or 3, wherein the amount of fuel presented to said means for preheating is just sufficient to heat said oxygen to a temperature sufficient to insure production of said hypergolic combustion.

10. The apparatus of claim 8, wherein said fuel is kerosene.

11. The apparatus of claim 3, wherein said hazardous waste is polychlorinated biphenyl (PCB).

12. The apparatus of claim 8, wherein said substantially pure oxygen may contain small amounts of nitrogen to reduce the heat of said hypergolic combustion;

said small amounts of nitrogen being varied in quantity to control the heat produced by said hypergolic combustion.

13. A process of incinerating hazardous waste comprising the steps of:

providing a mixture of fuel and hazardous waste;

preheating oxygen to a temperature sufficient to produce a hypergolic combustion when mixed said fuel;

mixing said mixture and said preheated oxygen to produce a hypergolic combustion and thereby produce a temperature sufficient to oxidize said hazardous waste.

14. The process of claim 13, wherein said step of preheating comprises the steps of:

supplying oxygen to a preheater combustion cavity;

supplying metered amounts of fuel to said preheater combustion cavity, said metered amounts of fuel being substantially less than the amount necessary to fully combust said supplied oxygen;

mixing said fuel and said oxygen;

initially igniting said mixture to initiate a partial combustion;

said oxygen not combusted being thereby heated by said partial combustion.

15. The process of claim 14, wherein said step of mixing comprises the steps of:

atomizing said mixture; and producing turbulence in said preheated oxygen to rapidly distribute said mixture throughout said preheated oxygen.

16. The process of claim 15, wherein said hypergolic combustion produces combustion products, said process further comprising the step of controlling the time duration of said hypergolic combustion by restricting the flow of said combustion products.

17. The process of claim 14, wherein said oxygen is substantially pure.

18. The process of claim 14, wherein said fuel is kerosene.

19. The process of claim 14, wherein said hazardous waste is polychlorinated byphenyl (PCB).

20. The process of claims 13 or 14, wherein temperatures produced by said hyperbolic combustion are controlled by adding small amounts of nitrogen to said oxygen to reduce the heat of combustion.

* * * * *